Feb. 24, 1970     H. M. PHILOFSKY     3,497,737
CONNECTING MEANS FOR DYNAMOELECTRIC MACHINE COOLING SYSTEM
Filed June 19, 1968     3 Sheets-Sheet 3

United States Patent Office 3,497,737
Patented Feb. 24, 1970

3,497,737
CONNECTING MEANS FOR DYNAMOELECTRIC MACHINE COOLING SYSTEM
Harold M. Philofsky, Pittsburgh, Pa., assignor to Westinghouse Electric Corporation, Pittsburgh, Pa., a corporation of Pennsylvania
Filed June 19, 1968, Ser. No. 738,361
Int. Cl. H02k *3/22, 3/24*
U.S. Cl. 310—54                              4 Claims

ABSTRACT OF THE DISCLOSURE

A connector for use in cooling systems of large turbine generators of the inner cooled type in which a coolant fluid is circulated through the stator coils in a closed system. The connector connects individual hollow conductors of each coil side to the coolant system with the conductors insulated from the coolant system and each other and also makes the necessary electrical connections between conductors of different coil sides.

BACKGROUND OF THE INVENTION

This invention relates, generally, to cooling systems for dynamoelectric machines and, more particularly, to connectors for connecting the stator coils of large turbine generators to external parts of the cooling system.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size.

These machines have usually been cooled by a coolant gas, hydrogen being commonly used, which fills the gas-tight housing and is circulated by a blower on the rotor shaft through the ducts of the stator and rotor windings and through radial ducts in the stator core. As the ratings of these large generators have increased, however, it has become desirable to further improve the cooling of the stator windings, and for this purpose it has been proposed to use more efficient coolant fluids in the ducts of the stator winding. Such coolants may for example be a liquid such as water, or a gas at high pressure such as hydrogen at a pressure of several hundred pounds per square inch. The use of such coolant fluids requires that the coolant be circulated through the stator coils in a closed recirculating system separate and sealed from the coolant gas in the housing which cools the stator core and the rotor winding.

One of the problems encountered in providing such a closed cooling system is to provide a satisfactory connection from the external part of the cooling system to the cooling tubes or ducts located within the stator coils, which may be hollow winding conductors or separate vent ducts. One possible method would be to connect each tube individually to the external piping system. This would be prohibitive from a manufacturing standpoint, however, because of the large number of individual tubes in a generator. Another method would be to fit a metal fitting or connector over all the tubes in parallel at the ends of each stator coil. This has the serious disadvantage that the metal vent tubes are shorted together at the ends of the coils, thereby preventing the making of group transpositions and resulting in circulating currents and eddy current losses in the tubes.

SUMMARY OF THE INVENTION

The principal object of the present invention is to provide a dynamoelectric machine of the inner cooled type having a closed system for circulating coolant fluid through cooling ducts in the stator coils and having connectors or fittings for connecting the ducts to the cooling system which avoid the difficulties mentioned above.

In accordance with a preferred embodiment of the invention, the ends of the conductors of two series-connected stator coils are joined by metal rectangular sleeves, preferably copper. Each sleeve has a hole therein around which the end of a short piece of metal tubing is brazed. A piece of metal pipe, closed at one end, has holes therein aligned with holes in the sleeves and has a short piece of metal tubing brazed around each hole. The two pieces of tubing for each pair of aligned holes are joined by a ceramic tube, brazed to the metal tubes. The open end of the pipe has a fitting thereon for connecting to external piping of the cooling system.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENT

Figure 1:
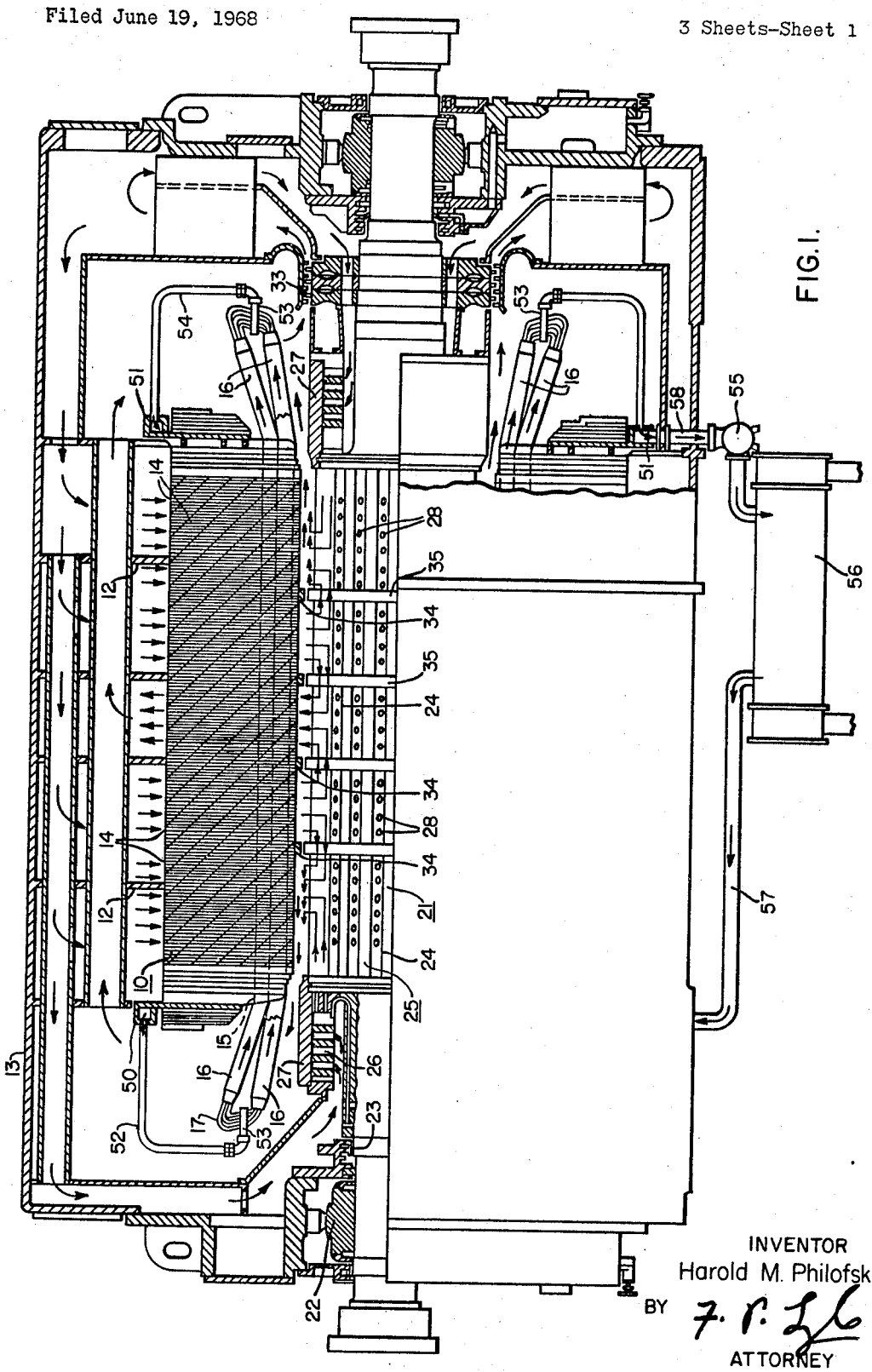
FIGURE 1 is a view, partly in section and partly in elevation, of a turbine generator having a cooling system embodying principal features of the invention.

Referring to the drawings, and particularly to FIGURE 1, the generator construction shown for the purpose of illustration is generally similar to that shown in a patent to R. A. Baudry, No. 3,110,827, issued Nov. 12, 1963. However, it will be understood that the present invention may be utilized with any dynamoelectric machine having a closed cooling system for the stator coils of the machine.

As shown, the generator has a stator core 10 supported by frame rings 12 in a substantially gas-tight outer housing 13. The stator core 10 is of the usual laminated type having a generally cylindrical bore therethrough. The core 10 is built up of laminations arranged in spaced stacks to provide radial vent ducts 14 between them, and the laminations of the core are clamped between suitable end plates in the usual manner. The stator core 10 is provided with longitudinal slots 15 in its inner periphery for the reception of a stator winding which may be of any suitable type and which preferably consists of a plurality of half-coils 16 connected at their ends to form the winding.

Figure 2:
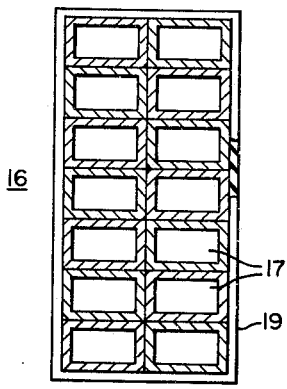
FIG. 2 is a view, partly in section and partly in end elevation, of one of the stator coils of the generator.
Figure 3:
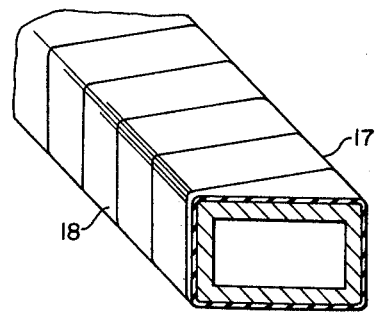
FIG. 3 is an isometric view of a portion of one of the conductors of the stator coil.

The stator winding is of the inner-cooled construction and, as shown in FIG. 2, each half-coil 16 may comprise a plurality of hollow, generally rectangular conductors 17, which are lightly insulated and may be transposed in the usual manner. The insulation of the conductor 17 is not shown in FIG. 2, but is shown at 18 in FIG. 3 in which one of the hollow conductors 17 is illustrated. The conductors 17 are made hollow to permit the circulation of a coolant fluid through each conductor, so that the conductors themselves form the cooling tubes. It will be understood that not all the conductors need be hollow and, in some cases, a combination of hollow and solid conductors may be used, or cooling tubes separate from the conductors might be used. Each half-coil 16 is enclosed in a heavy sheath of insulation 19 to provide the necessary high voltage insulation to ground. Two half-coils are placed in each slot 15 of the stator core and the slots are closed by suitable wedges in the usual manner.

A rotor 21 is disposed in the bore of the stator core 10 and separated from the stator by an annular air gap. The rotor 21 is supported in bearings 22 of any suitable type mounted in the ends of the housing 13, and gland seals 23 are provided to prevent leakage of gas from the housing along the rotor shaft. The rotor 21 is provided with longitudinal slots 24 in its periphery for the reception of a field winding 25. The conductors of the winding 25 extend longitudinally of the rotor and have circumferentially extending end turn portions 26 which are supported against centrifugal forces by retaining rings 27 of the usual construction. The rotor winding 25 may be of the type described in the above-mentioned patent, comprising a plurality of insulated turns each of which consists of two generally channel-shaped conductors placed in face-to-face relation to form a longitudinal duct extending from end to end of the rotor through the center of each turn of the winding. Radial passages 28 are provided in the rotor conductors to connect the longitudinal ducts to the air gap to permit the coolant gas in the housing to flow through the ducts.

The housing 13 of the machine is made as nearly gastight as possible, and is sealed at the points where the rotor shaft passes through it by the gland seals 23. The housing is filled with a suitable coolant gas, preferably hydrogen, which is used in the illustrated embodiment for cooling the rotor and the stator core. A blower 33 is mounted on the rotor shaft adjacent one end of the machine for circulating the gas therethrough. Any suitable type of blower may be utilized and a multi-stage blower of the axial flow type is shown in the drawing for purposes of illustration. The gas in the machine is maintained at a suitable static pressure which may, for example, be from 30 to 75 pounds per square inch above atmospheric pressure, although lower or higher gas pressures may be utilized, depending on the desired rating of the machine. The blower 33 develops a sufficient differential pressure to maintain the desired circulation of gas within the housing and through the ducts in the rotor and the stator core.

The gas in the housing may be circulated in any desired manner by the blower 33 to flow through the radial ducts 14 of the stator core and through the ducts of the rotor winding to cool the stator core and the rotor. In the particular machine shown in the drawing, the air gap is divided transversely into a plurality of annular zones by means of baffles 34 on the stator core and baffles 35 on the rotor, and adjacent zones are maintained at different gas pressures to cause the gas to flow from high pressure zones to adjacent low pressure zones through the ducts of the rotor winding. Suitable baffles and ducts are provided in the housing to cause the gas to flow in the desired manner, indicated by arrows in FIG. 1. This method of cooling the rotor and the means by which the desired gas flow is obtained are fully described in the above-mentioned Baudry Patent No. 3,110,827 to which reference is made for a more complete description. The means for cooling the rotor and the stator core will not be further described herein, since they are not a part of the present invention, and the stator winding cooling system may be used in any machine having any desired cooling system for the rotor.

In accordance with the present invention, the stator winding is cooled by a closed recirculating system for circulating coolant fluid through the tubes or hollow conductors of the stator winding. Such a stator cooling system may include an intake manifold 50 at one end of the stator core 10 and a discharge manifold 51 at the opposite end. These manifolds may be annular passages extending circumferentially around the core and mounted at the ends of the stator core in any suitable manner. The intake manifold 50 is connected by a plurality of insulating pipes or tubes 52 to the end of each half-coil 16 of the winding, the tubes 52 being connected by connectors 53 to the hollow conductors 17. At the opposite end, similar connectors 53 connect the conductors 17 to insulating pipes 54 which are connected to the discharge manifold 51.

The coolant fluid for the stator winding is circulated by means of an external pump or compressor 55, depending upon whether a liquid or a gas is utilized, which circulates the coolant discharged from the machine through a cooler 56, of any suitable type, and through an entrance pipe 57 which passes through the housing 13 and is connected to the intake manifold 50. The coolant discharged at the opposite end of the machine flows from the manifold 51 to a discharge pipe 58 which passes through the housing 13 to the pump or compressor 55.

In this way a closed recirculating system is provided which is entirely separate from the cooling system for the rotor and the stator core, so that more effective cooling of the stator winding can be obtained. The coolant for the stator winding is preferably a suitable liquid, such as water, or other suitable coolant fluids such as high pressure hydrogen may be used.

As explained hereinbefore, the stator winding is of the direct-cooled conductor type, each half-coil 16 of the winding comprising a plurality of hollow conductors 17 which are arranged in two stacks in the coil. Thus, it is necessary to provide for connecting each hollow conductor 17 to the external cooling system for the stator winding. Also, it is necessary to provide for electrically connecting the ends of the conductors of each half coil to the conductors of another half-coil. Furthermore, it is usually necessary to provide group transpositions of the stator coils to reduce eddy current losses.

In order to meet the foregoing requirements the combined hydraulic and electrical connector disclosed herein is provided. As shown most clearly in FIGS. 4 and 5, each connector 53 comprises a metal pipe 61 which is closed at one end and has a fitting 62 at the other end for connecting to the piping 52 or 54 of the external cooling system. The pipe 61 has a plurality of spaced holes 63 therein. A short piece of metal tubing 64 is secured to the pipe 61 around each hole 63 by brazing or in any other suitable manner.

Figure 4:
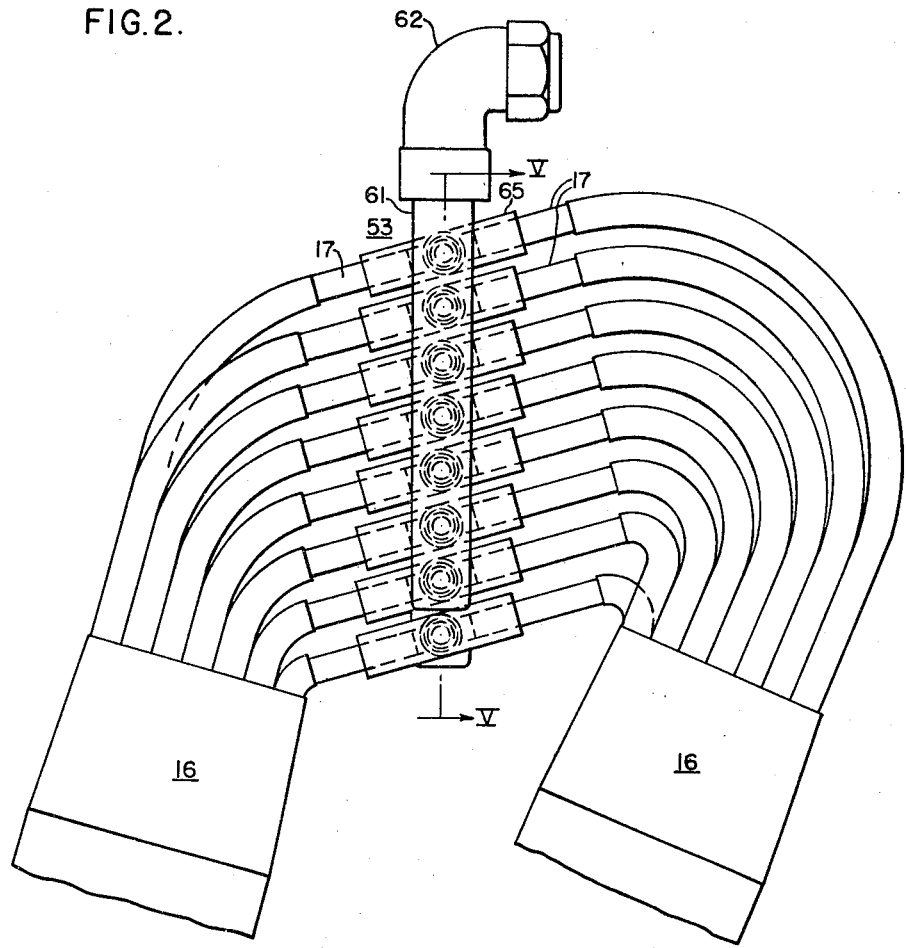
FIG. 4 is an enlarged view, in elevation, of the connector provided for connecting conductors of the stator coils in series and to piping of the cooling system.

A generally rectangular sleeve 65 is associated with each hole 63 in the pipe 61. The sleeves 65 are made of a conducting material, preferably copper, and, as shown in FIG. 4, each sleeve 65 joins the ends of two conductors 17 in different half-coils 16. Thus, the two conductors are connected in series. The ends of the conductors may be brazed in the sleeve 65 or otherwise secured with a fluid-tight joint of good electrical conductivity.

Figure 5:
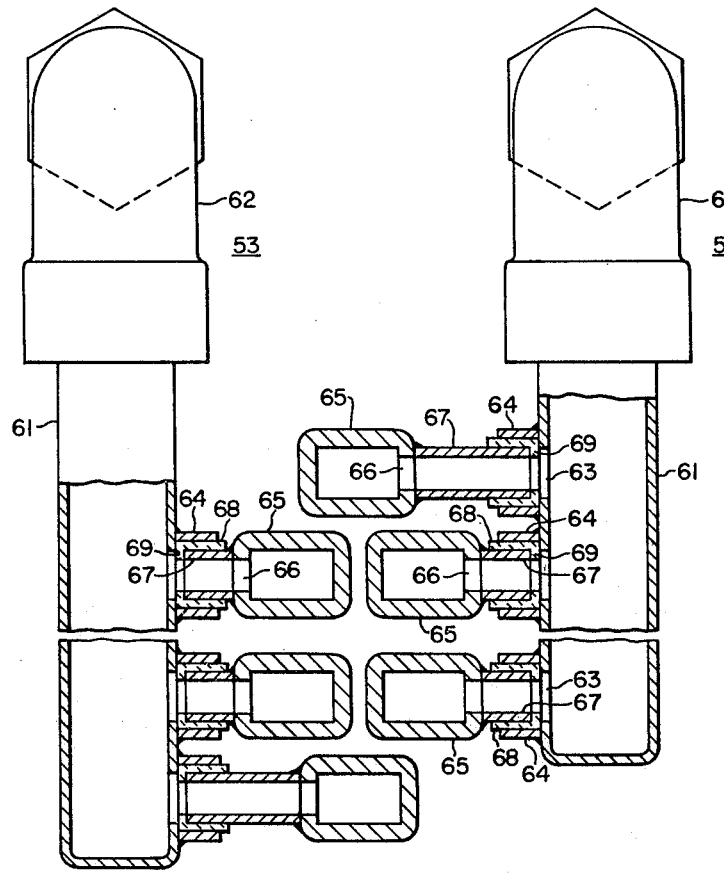
FIG. 5 is a view, partly in elevation and partly in section, the section being taken along the line V—V of FIG. 4, and FIGS. 6, 7 and 8 are detailed views of modified connectors.

As shown most clearly in FIG. 5, the sleeves 65 are generally rectangular in shape and each sleeve has an opening 66 therein. A piece of metal tubing 67 is brazed or otherwise secured to the sleeve 65 around the opening 66. The tubing 67 is of a smaller diameter than the tubing 64 and is disposed inside the tubing 64 with an insulating tube 68 disposed between the two pieces of tubing 64 and 67. The tube 68 is preferably a ceramic material, and each tube 68 may have a flange 69 at one end thereof disposed between the end of the tubing 67 and the pipe 61. Thus, the conducting sleeve 65 is insulated from the pipe 61 by the ceramic tube 68 which is preferably brazed to the two pieces of tubing 64 and 67 which, in turn, are brazed to the pipe 61 and the sleeve 65, respectively. It will be noted that one piece of tubing 67 at the top or bottom of the connector is longer than the other pieces, thereby offsetting one sleeve 65 to facilitate transposition of the conductors.

As explained hereinbefore, the conductors 17 are arranged in each half-coil 16 in two stacks disposed side-by-side. Thus, as shown in FIG. 4, a connector 53 is provided for connecting each stack of conductors in one half-coil to a stack of conductors in another half-coil which is disposed in a different stator slot from the first half-coil. Therefore, as shown in FIG. 5 two connectors 53 are provided at each connection between two series-connected half-coils.

The fitting 62 is provided for connecting to the piping 52 or 54 of the external cooling system. Thus, the coolant flows into the pipe 61 and through the holes 63 into the hollow conductors 17 and then through the conductors to a similar connector 53 at the other end of the coil where the coolant is returned to the external cooling system. Therefore, the connector 53 provides for making the hydraulic and electrical connections between the ends of series-connected coils. The ceramic tubes 68 insulate the electrical portion of the connector from the hydraulic portion, thereby preventing shorting or grounding of the conductors at the ends of the coils. Ceramic is preferable as insulating material since it can withstand the heat used for the brazing operations.

The pipe 61, the sleeves 65, the pieces of metal tubing 64 and 67 and the ceramic tubes 68 can be preassembled with the parts brazed together. When the conductors 17 are ready for connection the appropriate conductors are positioned into the sleeves 65 and brazed in these sleeves in a manner similar to the usual practice of connecting coils.

Figure 6:
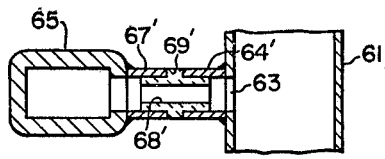
Figure 7:
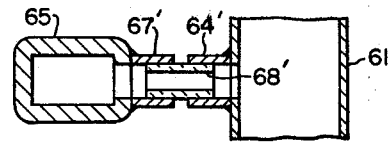
Figure 8:
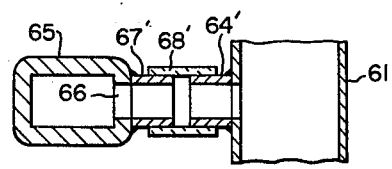

Alternate arrangements of the ceramic tube and the short pieces of metal tubing which are secured to the pipe 61 and the sleeves 65 are shown in FIGS. 6, 7 and 8. As shown in FIG. 6, the two pieces of metal tubing 64' and 67' are of the same diameter. They are aligned and held in spaced relation by the ceramic tube 68' which is disposed inside the two pieces of metal tubing 64' and 67'. A projection 69' which extends around the outer periphery of the tube 68' is disposed between the ends of the two pieces of tubing 64' and 67' which are secured to the pipe 61 and the sleeve 65, respectively.

The structure shown in FIG. 7 is similar to that shown in FIG. 6 with the exception that the projection 69' is omitted from the tube 68'. However, the two pieces of metal tubing 64' and 67' are maintained in spaced relation since they are brazed to the ceramic tube 68'.

The structure shown in FIG. 8 is similar to that shown in FIG. 7 with the exception that the ceramic tube 68' is secured to the outside of the two pieces of metal tubing 64' and 67'. Thus, in all cases the electrical conducting sleeves 65 are insulated from the metal pipe 61.

From the foregoing description, it is apparent that the invention provides a combined hydraulic and electrical connector which is particularly suitable for connecting direct cooled conductors of a stator coil winding to the piping of a closed cooling system for the stator coils. The connector provides for insulating the electrical conductors from the hydraulic system and it permits the usual group transpositions to be made without difficulty. The connector is relatively simple in construction and can be manufactured at a relatively low cost.

Since numerous changes may be made in the above described construction and different embodiments of the invention may be made without departing from the spirit and scope thereof, it is intended that all subject matter contained in the foregoing description or shown in the accompanying drawings shall be interpreted as illustrative and not in a limiting sense.

I claim:

1. In a dynamoelectric machine having an annular stator core with a plurality of longitudinal slots therein, a stator winding comprising a plurality of half-coils disposed in said slots, each half-coil including a plurality of conductors, at least some of the conductors in each half-coil being hollow, coolant supply means for circulating a coolant fluid through said hollow conductors, connecting means at each end of each half-coil, said connecting means including a plurality of hollow conducting sleeve members for electrically connecting the conductors of one half-coil to the conductors of another half-coil, said sleeve members being disposed generally parallel to each other in positions corresponding to the positions of said conductors, a pipe member extending transversely of said sleeve members and having openings communicating with each of said sleeve members, means for insulating the pipe member from the sleeve members, and means for connecting the pipe member to the coolant supply means.

2. The combination defined in claim 1 in which tubular members connect the pipe members to each of the sleeve members, said tubular members including insulating means for insulating the pipe member from the sleeve members.

3. The combination defined in claim 1 in which each opening in the pipe member is connected to a corresponding sleeve member by a first metal tube secured to the pipe member, a second metal tube secured to the sleeve member, and means for joining the first and second tubes with a fluid-tight insulating connection.

4. The combination defined in claim 3 in which the means for joining the first and second tubes is a ceramic tube disposed between the first and second tubes and joined thereto.

References Cited

UNITED STATES PATENTS

| | | | |
|---|---|---|---|
| 3,034,003 | 5/1962 | Seidner | 310—61 |
| 3,254,246 | 5/1966 | Philofsky et al. | 310—55 |
| 3,249,680 | 5/1966 | Sheets et al. | 174—16 XR |
| 3,046,424 | 7/1962 | Tudge | 310—61 |
| 2,898,484 | 8/1959 | Krastchew | 310—54 XR |

MILTON O. HIRSHFIELD, Primary Examiner

B. A. REYNOLDS, Assistant Examiner

U.S. Cl. X.R.

285—48; 310—58, 59